United States Patent [19]

Hanson et al.

[11] Patent Number: 4,632,760
[45] Date of Patent: Dec. 30, 1986

[54] METHOD OF TREATING AQUEOUS SOLUTIONS

[75] Inventors: Donald N. Hanson, 522 Moraga Way, Orinda, Calif. 94563; Scott Lynn, 2646 San Antonio Dr., Walnut Creek, Calif. 94598

[73] Assignees: Donald N. Hanson, Orinda; Scott Lynn, Walnut Creek, both of Calif.

[21] Appl. No.: 774,953

[22] Filed: Sep. 11, 1985

Related U.S. Application Data

[63] Continuation of Ser. No. 567,764, Jan. 3, 1984, abandoned, and a continuation-in-part of Ser. No. 178,870, Aug. 18, 1980, Pat. No. 4,430,227.

[51] Int. Cl.$^4$ .............................................. B01D 11/04
[52] U.S. Cl. .................................................. 210/642
[58] Field of Search ................ 210/642, 634; 423/179, 423/181, 157

[56] References Cited

U.S. PATENT DOCUMENTS 3,239,459 3/1966 Patterson ............................ 210/642

Primary Examiner—Frank Spear
Attorney, Agent, or Firm—Edward B. Gregg

[57] ABSTRACT

Method of treating an aqueous solution of a non-volatile inorganic solute to produce a more concentrated solution or to crystallize solid solute from the solution. The solution is contacted at a higher temperature $T_1$ with a suitable organic liquid to extract water and form an organic phase (organic liquid contacting water). The organic phase, separated, cooled and contacted at a lower temperature $T_2$ with a drying medium to dry the organic liquid which is then re-used to treat a further quantity of aqueous solution. The drying medium may be a portion of the concentrated aqueous solution resulting from the first step, or it may be a concentrated aqueous solution or a slurry from an outside source, or it may be a combination of two such drying media.

10 Claims, 2 Drawing Figures

METHOD OF TREATING AQUEOUS SOLUTIONS

This is a continuation of co-pending application Ser. No. 567,764, filed on Jan. 3, 1984, now abandoned, and a continuation-in-part of our copending application, Ser. No. 178,870, filed Aug. 18, 1980, entitled "METHOD OF CONCENTRATING AQUEOUS SOLUTIONS", now U.S. Pat. No. 4,430,227.

In our copending application there is described a method of concentrating an aqueous solution of nonvolatile inorganic solute wherein the aqueous solution is contacted at a higher temperature $T_1$ with a suitable organic liquid to extract water from the aqueous solution and dissolve it in the organic liquid; the resulting organic phase (organic liquid used as extractant and dissolved water) is cooled to a lower temperature $T_2$ to separate water; and the organic liquid is re-used, normally with an added drying step.

More particularly, our copending application describes with reference to FIG. 2 thereof such a method wherein the aqueous solution is concentrated in two stages to produce a moderately concentrated aqueous solution and then a more highly concentrated aqueous solution, and a portion of the moderately concentrated solution is used to dry the wet solvent, i.e., the organic liquid used as an extractant and containing dissolved water.

We have now found that in such a process the wet solvent can be more advantageously dried by using a portion of the highly concentrated solution resulting from the process, or by the use of an outside source of an aqueous solution or slurry or by a combination of both such means. The outside source of drying material may be a soluble solid but preferably, if such is used, it should be slurried with or dissolved in a saturated aqueous solution since in any event it will dissolve in and/or form a slurry with the water extracted from the wet solvent.

The present invention will be described with respect to FIGS. 1 and 2 in which

Figure 1:
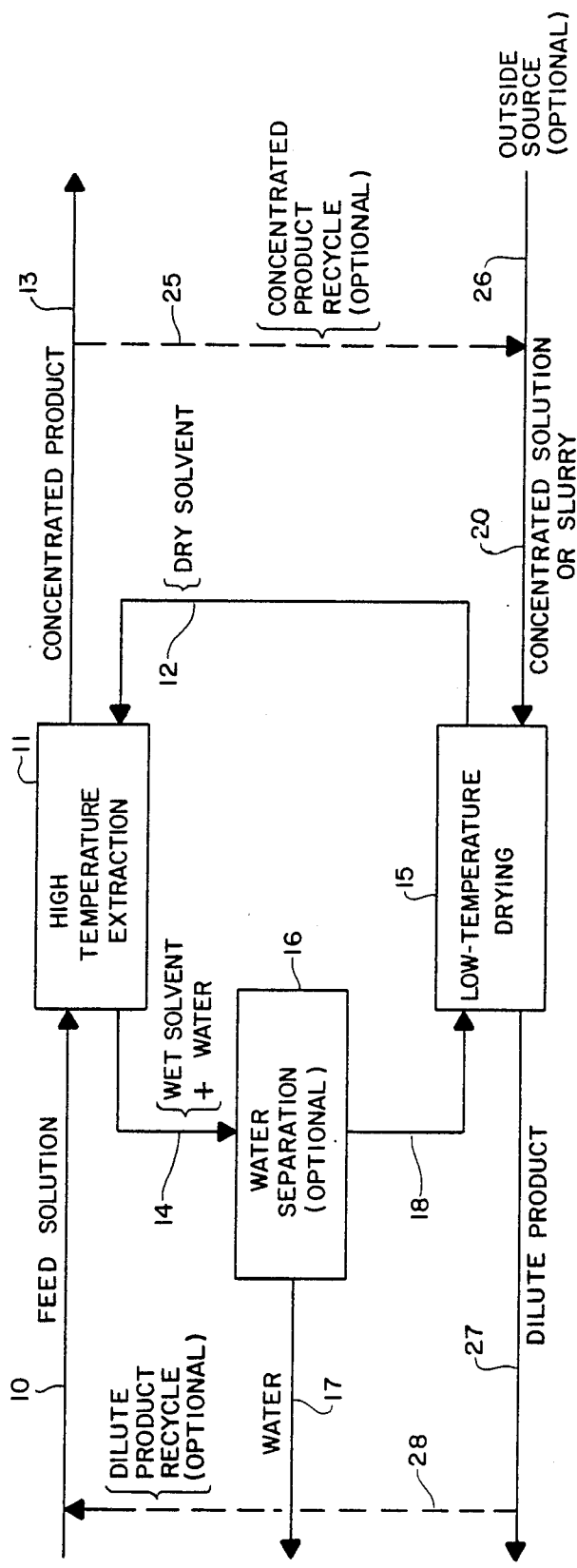
FIG. 1 is a flow diagram of a system in which concentrated aqueous solution and/or an outside source of aqueous solution or slurry is used to dry the wet solvent.
Figure 2:
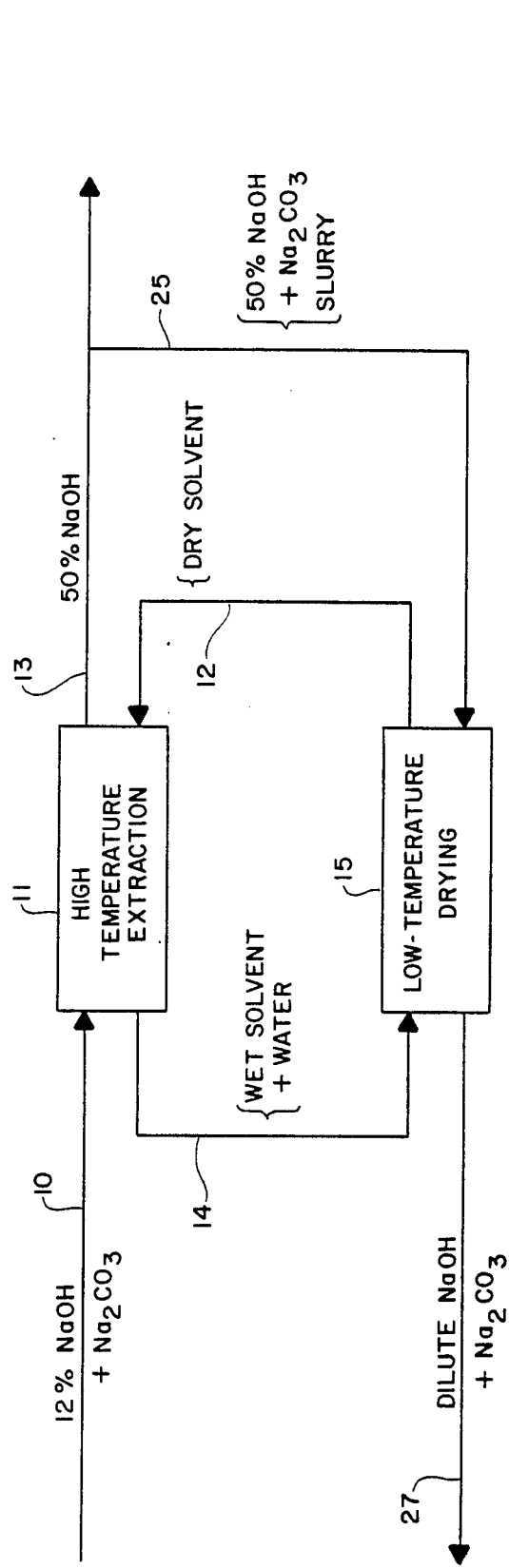
FIG. 2 is a flow diagram of a system employing the same invention but applying it to a solution resulting from causticizing a sodium carbonate solution to produce sodium hydroxide.

The flow diagrams of FIGS. 1 and 2 are simplified. It will be understood that heat exchangers, pumps and heat inputs will be provided in accordance with standard chemical engineering practice.

Referring now to FIG. 1, a dilute aqueous solution of an inorganic solute enters through line 10 and passes through a high temperature extraction zone or zones 11. The zone or zones 11 may be of any suitable design capable of efficiently contacting, in countercurrent manner, the dilute aqueous solution with a dry solvent which enters through line 12. The temperature in the extraction zone or zones 11 (hereinafter referred to in the singular) will be elevated to a temperature, e.g., to about 200° C., at which the solvent will extract water from the organic solution. Concentrated aqueous solution leaves through line 13 and wet solvent through line 14. As an example of heat exchange, the solvent in line 12 and the concentrated aqueous solution in line 13 may be passed through a heat exchanger (not shown) to heat the solvent and cool the concentrated aqueous solution.

A low-temperature extraction zone or zones 15 (referred to hereinafter in the singular) are also provided which, like the zone 11, are capable of causing intimate countercurrent contact between an organic phase and an aqueous phase. The organic phase is the wet solvent from zone 11 which may be cooled in cooling unit 16 to separate water (which leaves at 17) and then passes by line 18 to low-temperature zone 15.

Drying of the solvent in zone 15 is accomplished by a concentrated aqueous solution or slurry introduced through line 20. This solution or slurry (which constitutes the drying medium for drying the solvent) may be derived from the concentrated solution leaving through line 13 by diverting a portion through line 25, or it may be derived from an outside source and introduced through line 26, or it may be derived from both such sources.

The temperature in zone 15 is low enough that the concentrated solution or slurry introduced through line 20 will extract water from the solvent. The diluted solution leaves through line 27. If the solvent drying medium is a portion of the concentrated solution diverted from line 13, it may be returned to zone 11 through line 28 provided cooling unit 16 is used.

Referring now to FIG. 2, in which features similar to those in FIG. 1 are similarly numbered, the method of FIG. 1 is shown applied to a causticized solution of sodium carbonate prepared by treating sodium carbonate solution with lime. A typical causticized solution contains, as indicated, 12% NaOH plus $Na_2CO_3$ and it is desired to concentrate the solution to 50% NaOH. This is accomplished by countercurrent contact in zone 11 at, for example, 200° C., with a solvent such as 1,2-diethoxyethane. This results in wet solvent leaving through line 14 and a slurry of sodium carbonate in 50% aqueous NaOH which leaves through line 13. A portion, e.g., 10%, of the 50% NaOH is used to carry the solid $Na_2CO_3$ as a slurry through line 25 to zone 15 where it undergoes countercurrent contact with wet solvent. Dry organic solvent is returned through line 12 to zone 11 and dilute NaOH+$Na_2CO_3$ solution leaves through line 27.

The solvent drying medium may, as described above, be derived from various sources other than (or in addition to) the concentrated product of the process. For example, if a supply of concentrated sodium chloride solution or concentrated sodium carbonate solution or slurry is available, it may be used for this purpose. If, for example, it is desired to concentrate sodium carbonate solution, the concentrated solution leaving unit 11 through line 13 may be in the form of a slurry of sodium carbonate; the solid sodium carbonate may be separated; and the remaining concentrated solution may be used as a solvent drying medium.

The production of sodium carbonate from trona is another case in which the present invention may be employed to advantage. Trona is heated to convert the natural mineral to sodium carbonate which is dissolved in water to produce a solution of sodium carbonate which is free of impurities. The sodium carbonate solution is saturated. A portion of this saturated solution is treated in extraction zone 11 to produce solid sodium carbonate (product of the process) and wet solvent. Another part of the saturated solution is used as the solvent drying medium in zone 15. The resulting dilute sodium carbonate solution may be used to dissolve sodium carbonate from heated (converted) trona.

Other suitable drying media include solutions of sodium, magnesium or calcium chloride, solutions of sodium or ammonium phosphate, sodium hydroxide, etc.

A further advantage of the method of the invention is that water separated from wet solvent at 17 (see FIG. 1) is very low in inorganic solutes and may be used as wash water in a variety of industrial processes such as the removal of sodium compounds from precipitated calcium carbonate in the process for production of caustic from calcium carbonate. It may also be used in the case of trona treatment to dissolve sodium carbonate from treated trona.

A wide selection of organic liquids is available which may be used in the practice of the present invention. However, the selection should be guided by several considerations including the following:

(1) The organic liquid should be polar and must be stable at the highest temperature encountered during the process. (Also the solute must be stable at such temperatures.)

(2) The polar organic liquid must be unreactive or substantially unreactive with water and the solute or solutes at temperatures encountered during the process.

(3) The solute should have low solubility in, preferably being immiscible with the polar organic liquid at temperatures encountered during the process.

(4) Preferably the polar organic liquid is one which has a very low solubility in the aqueous phase at all temperatures encountered during the process. However, polar organic liquids which are miscible with water at ambient temperatures can be utilized.

(5) The equipment must be compatible with the conditions of use, e.g., as regards corrosion and pressure.

It is also preferred that the organic solvent be volatile, e.g., that it have a boiling point of about 70° to 130° C., so that residual solvent in the aqueous phases (the concentrated aqueous solution and the aqueous phase resulting from cooling the organic phase to separate water) can be readily removed by stripping. Also, it is preferred that the organic solvent be non-toxic.

Examples of suitable polar organic solvents are: alcohols such as butanols; also, cyclic alcohols such as cyclohexanol; ketones such as methyl ethyl ketone, methyl isobutyl ketone; ethers such as diethyl ether, dioxane, ethylene glycol dimethyl ether, and other ethers containing one or more oxygen atoms and two or more alkyl or alkylene groups and which may be either linear or cyclic; amines such as triethyl amine, n- and iso- propyl amines, and other primary, secondary, and tertiary alkyl amines; also aromatic compounds such as anisole.

Solvents which are substantially water-immiscible at ambient or room temperature, e.g., 20° C. to 40° C., which are volatile and therefore more readily separated from residual water by distillation and which are non-toxic or have acceptably low toxicity are preferred.

Polar organic liquids may be used which are mixtures of two or more molecular species, including mixtures of homologues and isomers and mixtures of different classes of organic liquids such as alcohols, ketones, ethers and/or amines.

Hydrophilicity of the solvent may be modified by, for example, introducing an alkyl group into a molecule which is otherwise too hydrophilic, or by mixing the hydrophilic polar organic liquid with a non-polar organic liquid such as an aliphatic or aromatic hydrocarbon or mixture of hydrocarbons which is miscible with the polar organic liquid. It will therefore be understood that the term "polar organic liquid" does not exclude the presence of a non-polar or less polar diluent used in an amount sufficient to impart the needed hydrophobicity at the lower temperature $T_2$.

The invention is applicable to concentrating dilute solutions to more concentrated (but unsaturated solutions) as in the case of concentrating 12% NaOH solution to 50% NaOH solution. In such cases countercurrent flow in extraction zone 11 is preferred. The invention is also applicable to the production of solid material slurried in saturated aqueous solution or to the complete extraction of water resulting in solid slurried in wet organic solvent. In such cases concurrent flow of aqueous solution and organic solvent is preferred.

It will therefore be apparent that a novel and advantageous method of concentrating aqueous solutions or of producing solid solute from saturating aqueous solutions has been provided.

What is claimed is:

1. A method of treating an aqueous solution of non-volatile ionic solute to concentrate the solution or to crystallize the solute, said method comprising:
    (a) providing a high-temperature extraction zone and a low-temperature extraction zone each of which is adapted for direct, intimate contact between two separate liquid phases,
    (b) providing a polar, organic solvent having low solubility for water at ambient temperatures and having an enhanced solubility for water at an elevated temperature, said polar organic solvent being stable and unreactive with the aqueous solution and solute and with the equipment employed and having low solvent power for the solute,
    (c) causing continuous, intimate contact between such aqueous solution and such solvent in the high-temperature extraction zone at an elevated temperature $T_1$ and continuously withdrawing from such zone a stream of wet solvent and a product which is (1) a stream of more highly concentrated aqueous solution, (2) a saturated solution which may contain crystallized solute or (3) crystallized solute substantially free from water,
    (d) cooling the effluent stream of wet solvent,
    (e) causing continuous, intimate contact in said low-temperature extraction zone at a temperature $T_2$ which is lower than $T_1$ between the thus cooled wet solvent and a drying medium which is an aqueous solution, an aqueous slurry or a solid thereby absorbing water from the wet solvent and producing a drier solvent,
    (f) continuously withdrawing from the low-temperature extraction zone drier solvent and an aqueous solution, and
    (g) reheating the drier solvent stream withdrawn in step (f) and using it in step (c).

2. The method of claim 1 wherein the wet solvent withdrawn in step (c) is cooled and caused to separate into an aqueous phase and a solvent phase and the solvent phase is used in step (e).

3. The method of claim 1 wherein at least a portion of the drying medium used in step (e) is from a source outside the system.

4. The method of claim 3 wherein the drying medium from the outside source contains a salt of sodium, potassium, magnesium or calcium.

5. The method of claim 3 wherein the solution drying medium from the outside source contains a carbonate, a phosphate, a chloride or a soluble hydroxide.

6. A method of concentrating relatively dilute aqueous solution to a more concentrated but unsaturated solution, said method comprising
   (a) providing a high-temperature extraction zone and a low-temperature extraction zone each of which is adapted for direct, intimate contact between two separate liquid phases,
   (b) providing a polar, organic solvent having low solubility for water at ambient temperatures and having an enhanced solubility for water at an elevated temperature, said polar organic solvent being stable and unreactive with the aqueous solution and solute and with the equipment employed and having low solvent power for the solute,
   (c) causing continuous, intimate, countercurrent contact between such dilute aqueous solution and organic solvent in the high-temperature extraction zone at an elevated temperature $T_1$ and continuously withdrawing from such zone a stream of concentrated aqueous solution and a stream of wet solvent,
   (d) cooling the effluent stream of wet solvent,
   (e) causing continuous, intimate countercurrent contact in said low-temperature extraction zone at a temperature $T_2$ which is lower than $T_1$ between the thus cooled wet wolvent and a drying medium which is an aqueous solution, an aqueous slurry or a solid, thereby absorbing water from the wet solvent to provide a drier solvent,
   (f) continuously withdrawing from the low-temperature extraction zone (1) aqueous solution containing water absorbed from the solvent and (2) drier solvent, and
   (g) reheating the drier solvent stream withdrawn in step (f) and using it in step (c).

7. A method of treating an aqueous solution of a non-volatile ionic solute to produce a slurry of solid solute in saturated aqueous solution or in wet organic solvent, said method comprising:
   (a) providing a high-temperature extraction zone which is adapted for direct, intimate, co-current contact between two separate liquid phases and a low-temperature extraction zone adapted for direct, intimate, countercurrent contact between two separate liquid phases,
   (b) providing a polar, organic solvent having low solubility for water at ambient temperatures and having an enhanced solubility for water at an elevated temperature, said polar organic solvent being stable and unreactive with the aqueous solution and solute and with the equipment employed and having low solvent power for the solute,
   (c) causing continuous, intimate, co-current contact between such aqueous solution and such solvent in the high-temperature extraction zone at an elevated temperature $T_1$ and continuously withdrawing from such zone wet solvent and a solid solute slurried in saturated aqueous solution or in wet solvent,
   (d) separating solid solute and saturated aqueous solution if any from wet solvent,
   (e) cooling the separated wet solvent,
   (f) causing continuous, intimate, countercurrent contact in said low-temperature extraction zone at a temperature $T_2$ which is lower than $T_1$ between the thus cooled wet solvent and a drying medium which is an aqueous solution, an aqueous slurry or a solid, thereby absorbing water from the wet solvent to provide a drier solvent,
   (g) continuously withdrawing from the low temperature extraction zone (1) aqueous solution containing water absorbed from the wet solvent and (2) drier solvent, and
   (h) reheating the drier solvent withdrawn in step (g) and using it in step (c).

8. The method of claim 7 wherein the drying medium used in step (f) is at least in part saturated solution resulting from step (d).

9. A method of producing a purified, water-soluble solid from a mixture of such solid with water-insoluble impurities, which comprises:
   (a) dissolving the water-soluble solid from such mixture in water to provide a saturated aqueous solution,
   (b) treating a portion of such saturated solution with a polar organic solvent which has low solubility for water at ambient temperatures and has an enhanced solubility for water at elevated temperature, such organic solvent being stable and unreactive with the aqueous solution and solute and with the equipment employed and having low solvent power for the solute, such treatment being at an elevated temperature $T_1$, whereby water is extracted from the saturated aqueous solution and a slurry of such water-soluble solid in wet organic solvents results,
   (c) separating such water soluble solid from wet organic solvent,
   (d) cooling the separated wet organic solvent to a temperature $T_2$ lower than $T_1$,
   (e) using another portion of said saturated aqueous solution to dry the separated wet solvent and
   (f) returning the thus dried solvent to step (b).

10. The method of claim 9 wherein the mixture so treated is calcined trona.

* * * * *